(12) United States Patent
Tanaka et al.

(10) Patent No.: US 8,475,645 B2
(45) Date of Patent: Jul. 2, 2013

(54) COOLING WATER CIRCULATION APPARATUS AND METHOD OF REMOVING SCALE FROM COOLING WATER CIRCULATION APPARATUS

(75) Inventors: Hiroshi Tanaka, Shizuoka (JP); Tatsuya Hibino, Aichi (JP)

(73) Assignees: Innovative Design & Technology Inc., Shizuoka (JP); Tohru Nemura, Gifu (JP); Daiken Data L.T.D., Aichi (JP)

( * ) Notice: Subject to any disclaimer, the term of this patent is extended or adjusted under 35 U.S.C. 154(b) by 1274 days.

(21) Appl. No.: 11/661,678

(22) PCT Filed: Sep. 6, 2004

(86) PCT No.: PCT/JP2004/012954
§ 371 (c)(1),
(2), (4) Date: Jul. 10, 2007

(87) PCT Pub. No.: WO2006/027825
PCT Pub. Date: Mar. 16, 2006

(65) Prior Publication Data
US 2008/0115925 A1    May 22, 2008

(51) Int. Cl.
*B01D 59/40* (2006.01)
(52) U.S. Cl.
USPC .......................... 205/687; 205/688; 205/744
(58) Field of Classification Search
USPC .......................................... 205/687, 688, 744
See application file for complete search history.

(56) References Cited

U.S. PATENT DOCUMENTS

| 2,004,559 | A | * | 6/1935 | Wappler | 606/46 |
|---|---|---|---|---|---|
| 2,339,911 | A | * | 1/1944 | Chamberlain | 205/573 |
| 2,500,039 | A | * | 3/1950 | Vance et al. | 205/539 |
| 2,851,654 | A | * | 9/1958 | Haddad | 324/444 |
| 3,047,797 | A | * | 7/1962 | Borsboom | 324/446 |
| 3,343,078 | A | * | 9/1967 | Shapiro | 324/446 |
| 3,361,150 | A | * | 1/1968 | Horner | 324/438 |
| 3,717,566 | A | * | 2/1973 | Wilson | 324/71.2 |
| 3,831,083 | A | * | 8/1974 | Teass et al. | 324/444 |
| 3,924,175 | A | * | 12/1975 | Wilson | 324/444 |
| 3,953,790 | A | * | 4/1976 | Ebling et al. | 324/446 |
| 3,993,945 | A | * | 11/1976 | Warmoth et al. | 324/449 |

(Continued)

FOREIGN PATENT DOCUMENTS

| CN | 1418175 | 5/2003 |
|---|---|---|
| JP | 06-335681 | 12/1994 |

(Continued)

*Primary Examiner* — Keith Hendricks
*Assistant Examiner* — Colleen M Raphael
(74) *Attorney, Agent, or Firm* — Wenderoth, Lind & Ponack, L.L.P.

(57) ABSTRACT

A cooling water circulation apparatus is capable of limiting attachment of microorganisms and scale in an environmentally friendly manner. An electrolytic device 10 is provided on a cooling water circulation route R1. In the arrangement, mineral contents such as calcium ions and magnesium ions contained in cooling water W are deposited as scale S on an electrode 12A or 12B in an electrolytic step, thereby enabling the mineral contents to be removed from the cooling water W. Even if the hardness of the cooling water W is increased by evaporation of the water with elapse of time, the hardness can be reduced by the electrolytic processing. Thus, the deposition of the scale S in the circulation route R1 can be reduced. Further, the scale S deposited on the electrode 12A or 12B can be easily separated by operating while reversing the polarities of the electrodes 12A and 12B at predetermined time intervals.

1 Claim, 9 Drawing Sheets

U.S. PATENT DOCUMENTS

| | | | |
|---|---|---|---|
| 4,362,994 A * | 12/1982 | Goldsmith et al. | 324/449 |
| 4,751,466 A * | 6/1988 | Colvin et al. | 324/449 |
| 4,908,109 A | 3/1990 | Wright | |
| 5,025,220 A * | 6/1991 | Colvin et al. | 324/449 |
| 5,087,883 A * | 2/1992 | Hoffman | 324/446 |
| 5,424,032 A * | 6/1995 | Christensen et al. | 422/14 |
| 6,232,786 B1 * | 5/2001 | Barnett | 324/444 |
| 6,259,242 B1 * | 7/2001 | Graham et al. | 324/446 |
| 6,646,443 B2 * | 11/2003 | Higo | 324/444 |
| 6,733,654 B1 * | 5/2004 | Itzhak | 205/742 |
| 6,781,389 B1 * | 8/2004 | Colvin et al. | 324/449 |
| 6,800,206 B2 | 10/2004 | Robinson | |
| 6,913,684 B1 * | 7/2005 | Barak et al. | 205/742 |
| 2003/0079998 A1 * | 5/2003 | Karin | 205/687 |
| 2003/0106854 A1 | 6/2003 | Robinson | |

FOREIGN PATENT DOCUMENTS

| | | |
|---|---|---|
| JP | 2000-140858 | 5/2000 |
| JP | 2001-259650 | 9/2001 |
| JP | 2003-334561 | 11/2003 |
| JP | 3096941 | 1/2004 |
| JP | 2004-132592 | 4/2004 |
| WO | WO9916715 A1 * | 4/1999 |
| WO | WO 0138232 A1 * | 5/2001 |

* cited by examiner

COOLING WATER CIRCULATION APPARATUS AND METHOD OF REMOVING SCALE FROM COOLING WATER CIRCULATION APPARATUS

BACKGROUND OF THE INVENTION

1. Field of the Invention

The present invention relates to a cooling water circulation apparatus and a method of removing scale from a cooling water circulation apparatus.

2. Description of Related Art

A cooling water circulation apparatus for circulating cooling water in a water-cooled appliance or the like, e.g., one disclosed in Japanese Patent Laid-Open No. 2000-140858 is known. In this apparatus, a heat exchanger or the like of the appliance is cooled by cooling water, and the cooling water thereby made warm is returned to a cooling tower to be cooled and is again circulated to the heat exchanger.

In such a cooling water circulation apparatus, water insoluble calcium salts (scale) may deposit on an inner wall of piping, or algae or microorganisms may multiply to cause a clogging in the piping or reduce the cooling efficiency. Multiplication of microorganisms in the apparatus is also undesirable in terms of hygiene. Therefore it is a common practice to add chemicals such as a sterilizer and an antiscalant to cooling water. If the hardness of cooling water is increased by evaporation of water with elapse of time, deposition of scale occurs easily. A method of monitoring the hardness of cooling water at all times and changing the cooling water in a cooling tower when the hardness becomes equal to or higher than a prescribed value has also been practiced.

In recent years, however, self-control on use of chemicals has been performed from the viewpoint of prevention of environmental pollution. There is a demand for development of a sterilization and scale-deposition prevention method substitutable for use of chemicals.

The method of changing cooling water when the hardness becomes equal to or higher than a prescribed value requires throwing away the entire cooling water in the cooling tower every time it is changed and therefore entails the water resource wasting problem.

BRIEF SUMMARY OF THE INVENTION

The present invention has been achieved in consideration of the above-described problems, and an object of the present invention is to provided a cooling water circulation apparatus capable of limiting attachment of microorganisms and scale in an environmentally friendly manner and a method of removing scale in the cooling water circulation apparatus.

The present invention is a cooling water circulation apparatus having the following elements: a cooling device for cooling water, a cooling water circulation route including the cooling device, the cooling water being circulated through the cooling water circulation route, an electrolytic device which performs electrolytic processing on the cooling water in the cooling water circulation route, and which causes the cooling water to flow into the cooling water circulation route. The electrolytic device includes an electrolytic bath for storing the cooling water, a pair of electrodes disposed in the electrolytic bath, and a voltage source for applying a voltage between the pair of electrodes.

According to the present invention, mineral contents such as calcium ions and magnesium ions contained in the cooling water and acting as a cause of scale are precipitated as scale on the electrode during the electrolytic processing. In this way, the mineral contents can be removed from the cooling water to reduce the attachment of scale in the circulation route. Also, hypochlorous acid or the like having sterilizing power is produced in the cooling water by the electrolytic processing, thereby enabling prevention of multiplication of microorganisms. Thus, the attachment of microorganisms and scale in the cooling water circulation route can be limited without using any chemical solution acting as a large environmental load. Also, replacing the cooling water in the circulation route can be limited to the least necessary number of cycles to reduce wasteful use of water resources.

BRIEF DESCRIPTION OF THE DRAWINGS

Illustrative aspects in accordance with the invention will be described in detail with reference to the following figures wherein.

DETAILED DESCRIPTION OF THE INVENTION

An embodiment of the present invention will be described in detail with reference to FIGS. 1 to 9.

Figure 1:
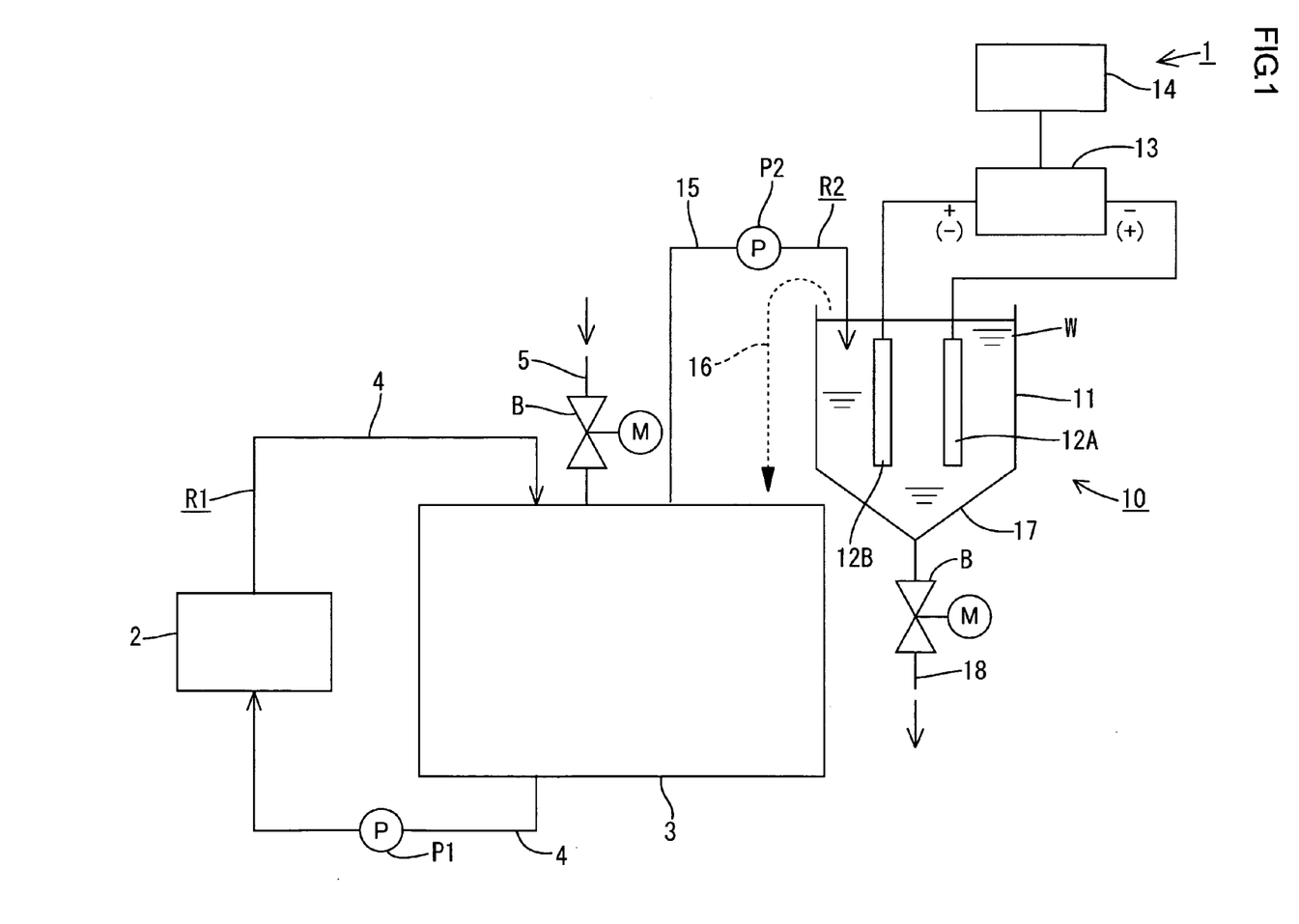
FIG. 1 is a line arrangement diagram showing a cooling water circulation apparatus according to an embodiment of the present invention.

FIG. 1 is a diagram schematically showing a cooling water circulation apparatus 1 which represents an embodiment of the present invention. The cooling water circulation apparatus 1 is an apparatus for circulating cooling water W through a heat exchanger 2 (an appliance to be cooled according to the present invention) provided in an air cooling apparatus, a refrigeration apparatus or the like.

A cooling water circulation route R1 through which cooling water is circulated (hereinafter referred to simply as "circulation route R1") is in a looped form as a whole, such that the heat exchanger 2 and a cooling tower 3 are connected to each other by two water flow pipes 4: a going route through which the cooling water W cooled in the cooling tower 3 flows toward the heat exchanger 2, and a returning route through which the cooling water W warmed by passage through the heat exchanger 2. The cooling tower 3 is of an ordinary construction, such that water is cooled by contact with air. A circulating pump PI is provided on the water flow pipe 4 on the going route side to enable the cooling water W cooled by the cooling tower 3 to be pressure-fed to the heat exchanger 2. The cooling water W flowing through the circulation route R1 is lost by evaporation with time and maintenance for example. Therefore the cooling tower 3 is provided with a makeup pipe 5 with a valve B for externally resupplying the cooling water W.

The cooling water circulation apparatus 1 has a bypass route R2 whose opposite ends are connected to the cooling tower 3. An electrolytic device 10 is provided on the bypass route R2.

The electrolytic device 10 has an electrolytic bath 11 for storing the cooling water W, a first electrode 12A and a second electrode 12B provided in the electrolytic bath 11. These electrodes 12A and 12B are connected to a direct current power supply 13 (corresponding to the voltage source of the present invention). The electrodes 12A and 12B are not particularly limited to specific ones as long as they are normally used in an electrolysis device. For example, electrodes made of titanium and coated with platinum or made of carbon for example, and free from solution of the components into the cooling water W, are preferably used as the electrodes 12A and 12B. A controller 14 (corresponding to the changing device and the conductivity monitoring device of the present invention) having a timer device and a polarity changing device is connected to the direct current power supply 13 to perform control of a voltage applied to the electrodes 12A and 12B and monitoring of a current/voltage between the two electrodes 12A and 12B.

A water supply pipe 15 for supplying the cooling water W from the cooling tower 3 and an outflow pipe 16 for returning cooling water W after electrolytic processing to the cooling tower 3 are connected to the electrolytic bath 11. The water supply pipe 15, the electrolytic bath 11 and the outflow pipe 16 constitute the bypass route R2. A bypass-side pump P2 is provided on the water supply pipe 15 to pressure-feed the cooling water W to the electrolytic bath 11. The outflow pipe 16 is arranged to return the cooling water W overflowing from the electrolytic bath 11.

A conical hopper 17 is provided at the bottom of the electrolytic bath 11. A discharge pipe 18 with a valve B is provided at the bottom of the hopper 17.

A procedure of electrolytic processing on the cooling water W in the cooling water circulation apparatus 1 constructed as described above will now be described.

When the circulation pump PI is operated, the cooling water W cooled in the cooling tower 3 is supplied to the heat exchanger 2 through the water flow pipe 4 to perform heat exchange. The cooling water W made warm by heat exchange is returned to the cooling tower 3 through the water flow pipe 4, cooled in the cooling tower 3 and fed to the heat exchanger 2. Thus, the cooling water W cooled by the cooling tower 3 is circulated through the cooling water circulation route R1 to perform cooling with the air cooling apparatus, the refrigeration apparatus or the like connected to the heat exchanger 2.

Figure 2:
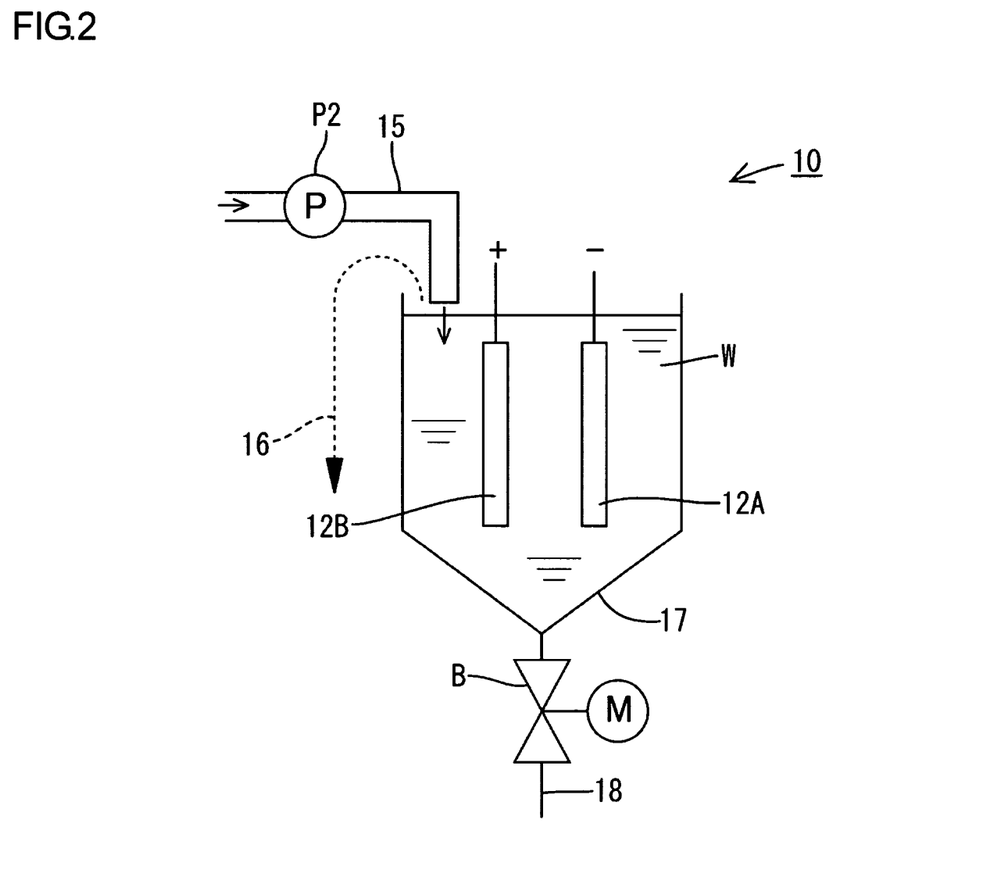
FIG. 2 is a schematic sectional view of an electrolytic device showing a step of supplying cooling water to an electrolytic bath.
Figure 3:
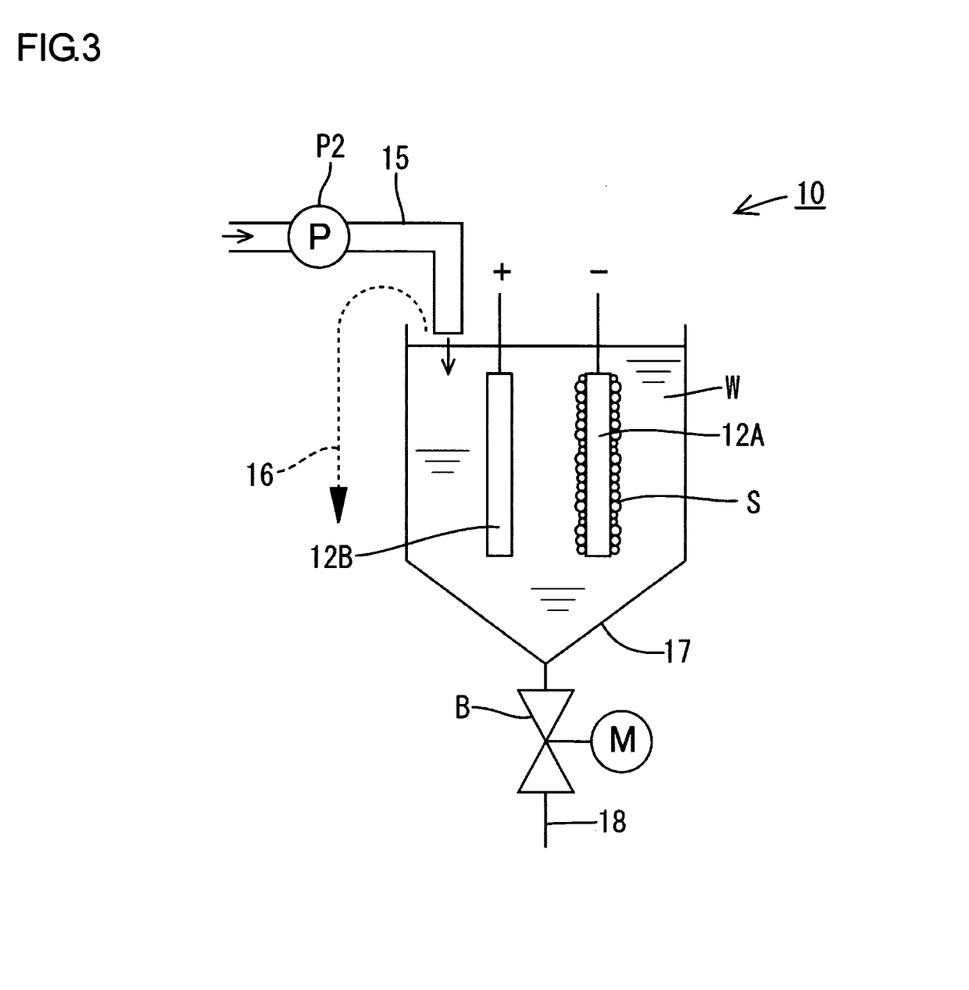
FIG. 3 is a schematic sectional view of the electrolytic device showing a state in which scale is attached to an electrode in a first precipitation step.

Part of the cooling water W circulating through the cooling tower 3 is supplied to the electrolytic bath 11 through the water supply pipe 15 by the operation of the bypass-side pump P2, as shown in FIG. 2. In the electrolytic bath 11, a direct current voltage is applied between the first and second electrodes 12A and 12B in a state where the first and second electrodes 12A and 12B are immersed in cooling water, the first electrode 12A used as a cathode, the second electrode 12B used as an anode, thereby performing electrolysis (hereinafter referred to as a first deposition step, corresponding to the electrolytic step of the present invention). Ions in mineral contents such as calcium ions and magnesium ions contained in the cooling water W are deposited as scale S on the surface of the cathode, i.e., the first electrode 12A (FIG. 3). The mineral contents are thereby removed from the cooling water W. The cooling water W constantly overflows from the electrolytic bath 11. The cooling water W in which mineral contents have been reduced by the electrolytic processing flows through the outflow pipe 16 in to the cooling tower 3.

As the operation is continued, the precipitated scale S is gradually deposited on the first electrode 12A on the cathode side. After the elapse of a predetermined operation time, the anode and the cathode are reversed and the operation is continued (discharge step).

Figure 4:
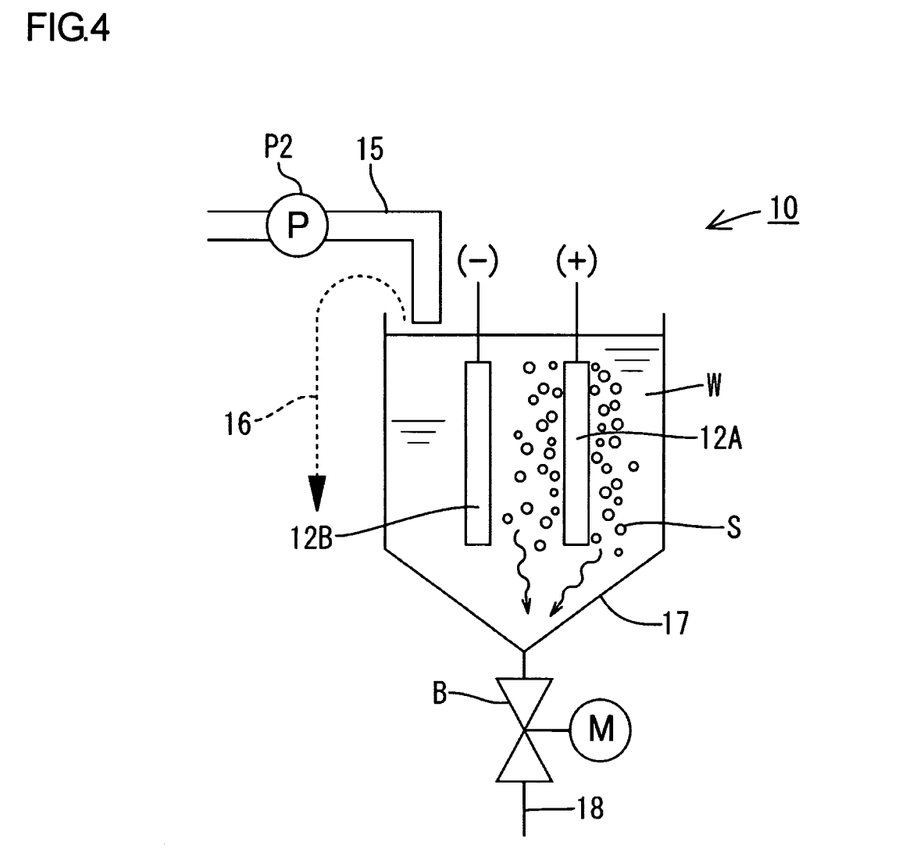
FIG. 4 is a schematic sectional view of the electrolytic device showing a first separation step.
Figure 5:
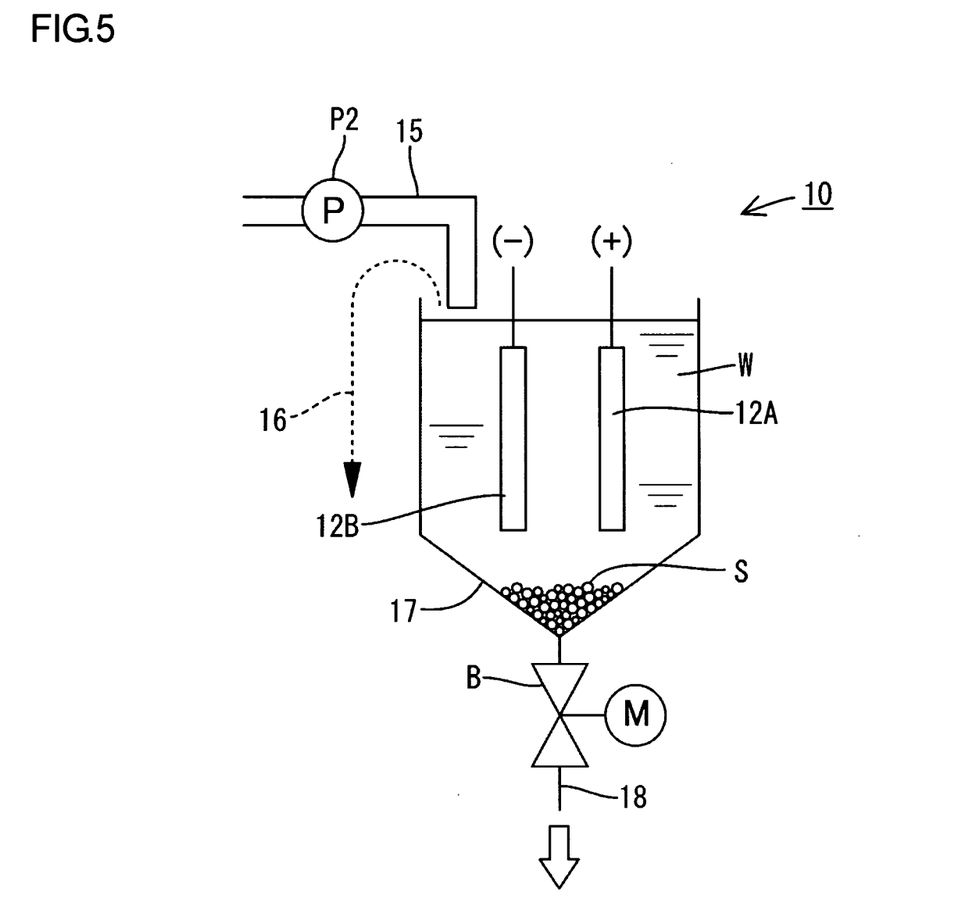
FIG. 5 is a schematic sectional view of the electrolytic device showing a discharge step.

In the discharge step, as shown in FIG. 4, the bypass side pump P2 is first stopped to stop supply of the cooling water W to the bypass route R2. The controller 14 then controls a voltage from the direct current power supply 13 to set the first electrode 12A and the second electrode 12B as the anode and the cathode, respectively, and apply a direct current voltage between the two electrodes 12A and 12B. The scale S deposited on the first electrode 12A in the first deposition step is thereby separated to fall into the hopper 17 provided at the bottom of the electrolytic bath 11. The scale S collected in the hopper 17 is discharged together with the cooling water W in the electrolytic bath 11 when the valve B of the discharge pipe 18 is opened (FIG. 5). At this time, the cooling water W in the electrolytic bath 1 is mineral-rich due to solution of part of the mineral contents from the separated scale S. Therefore, the cooling water W is entirely discharged. However, the capacity of the electrolytic bath 11 is extremely small in comparison with the cooling tower 3. The amount of discharge becomes much smaller in comparison with changing the entire water in the circulation route R1 at regular intervals as in the conventional apparatus, thus making it possible to limit wasteful consumption of water resources.

Figure 6:
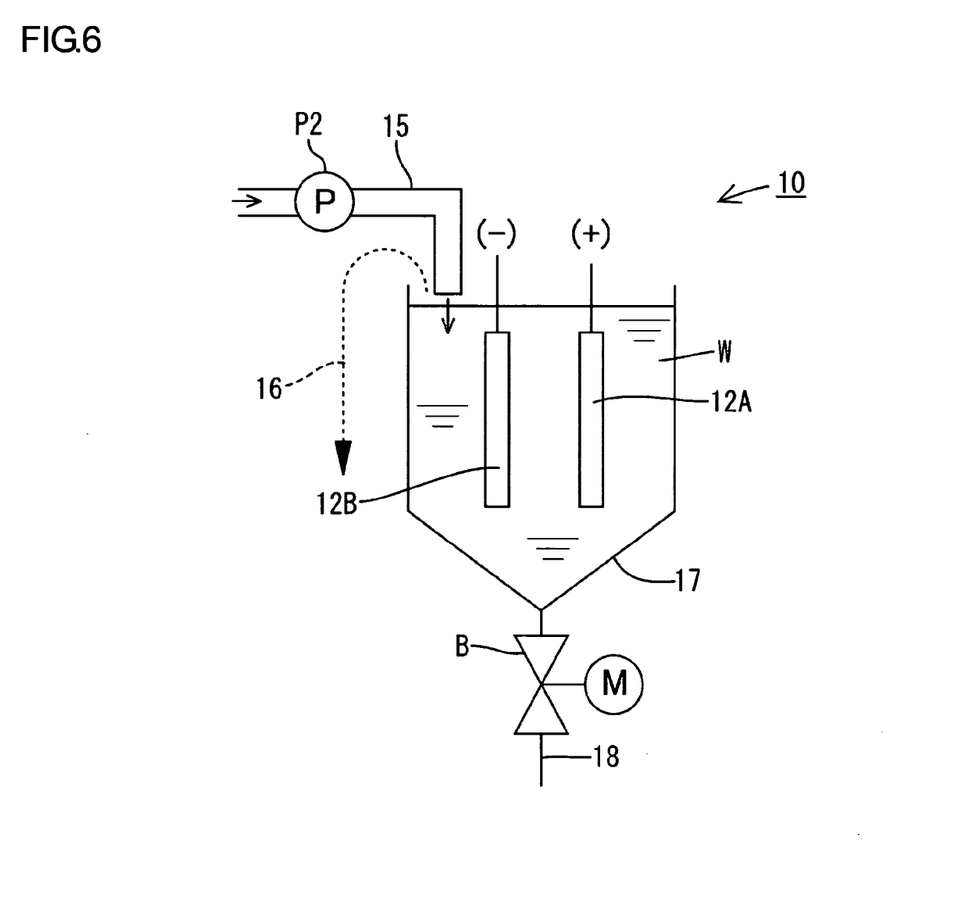
FIG. 6 is a schematic sectional view of the electrolytic device showing a state where supply of water to the electrolytic device is restarted.
Figure 7:
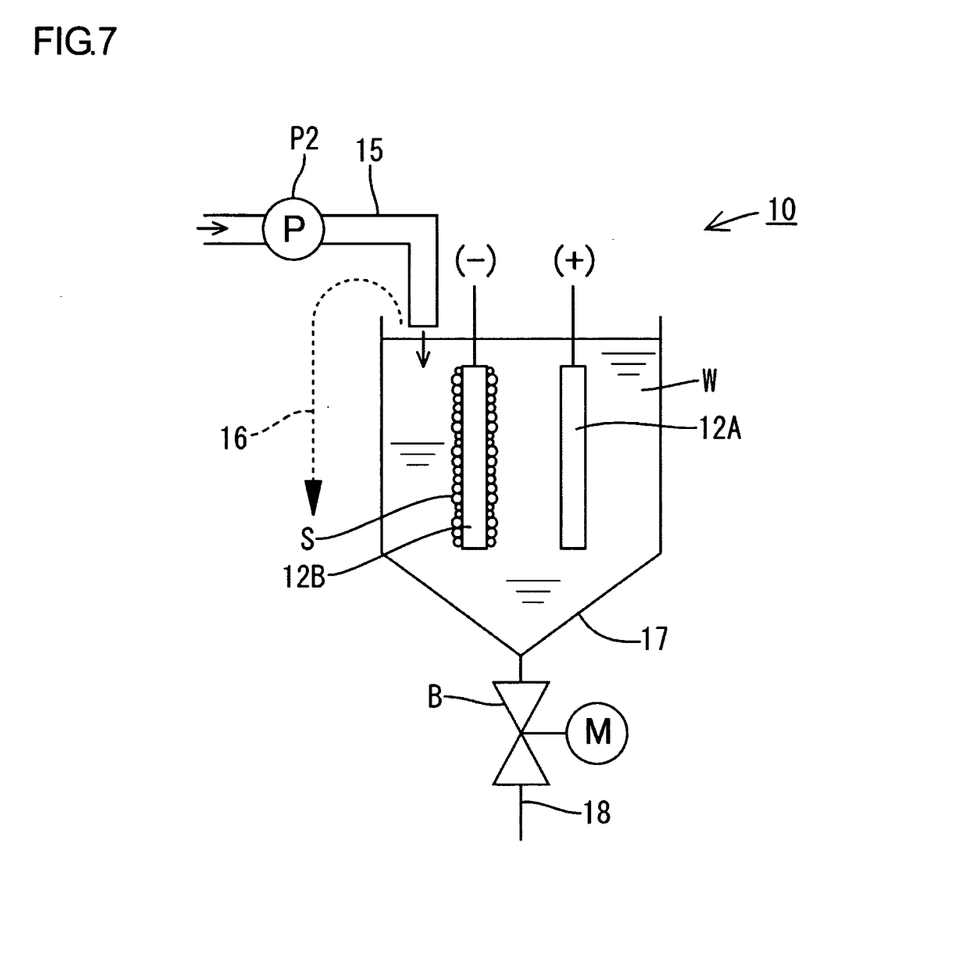
FIG. 7 is a schematic sectional view of the electrolytic device showing a second precipitation step.
Figure 8:
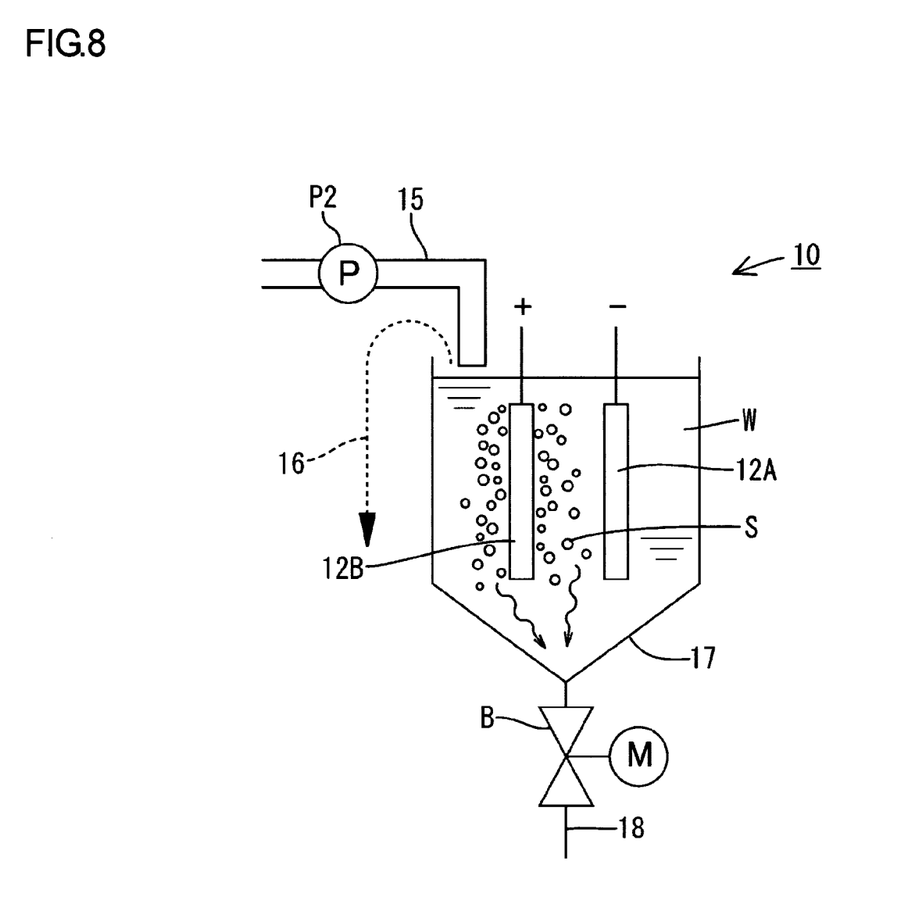
FIG. 8 is a schematic sectional view of the electrolytic device showing a second separation step.
Figure 9:
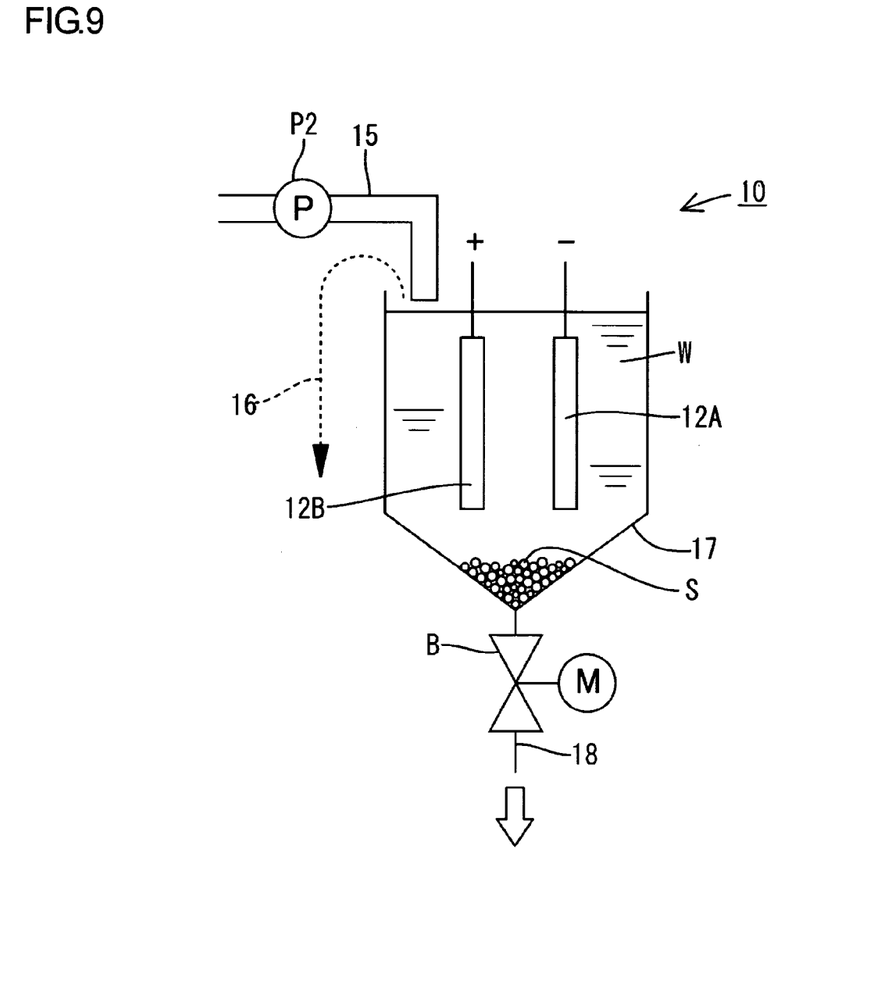
FIG. 9 is a schematic sectional view of the electrolytic device showing a second discharge step.

Subsequently, as shown in FIG. 6, while the pair of electrodes 12A and 12b are in the reversed positive-negative state, the bypass-side pump P2 is operated to restart supply of the cooling water W to the bypass route R2 and a direct current voltage is applied between the two electrodes 12A and 12B (hereinafter referred to as a second deposition step, corresponding to the electrolytic step of the present invention). Mineral contents such as calcium ions, magnesium ions and sodium ions are then deposited as the scale S on the surface of the second electrode 12B on the cathode side. As the operation is continued, the scale S is gradually deposited on the second electrode 12A on the cathode side (FIG. 7), as in the above-described first deposition step. After the elapse of a predetermined operation time, the anode and the cathode are again reversed and the operation is continued (FIG. 8) to remove the deposited scale S (discharge step, FIG. 9). In this way, the first deposition step and the second deposition step are repeated with the discharge step interposed therebetween.

Thus, the electrolysis is performed while the polarities of the pair of electrodes 12A and 12B are reversed at predetermined intervals to remove the scale S deposited on the cathode. The mineral contents are thereby removed to reduce the hardness of the cooling water W and to thereby prevent the attachment of scale in the circulation route RI. Also, hypochlorous acid or the like having sterilizing power is produced in the cooling water W by the electrolytic processing. Thus, multiplication of microorganisms in the circulation route R1 can be prevented.

There may be a situation which cannot be coped with by removal of the mineral contents performed by the electrolytic device 10, e.g., a situation where the hardness of the cooling water W increases abruptly due to abrupt evaporation of the water content for example. Therefore the function of monitoring a conductivity of the cooling water W is provided in the controller 14. That is, the controller 14 has a timer device and monitors values of current and voltage between the pair of electrodes 12A and 12B at predetermined time intervals during the deposition step and computes a conductivity of the cooling water W on the basis of the monitored values. If the conductivity exceeds a predetermined value, the controller 14 determines that the hardness of the cooling water W has increased to such a value that the situation cannot be coped with by the electrolytic device 10 alone, then stops the operation of the cooling water circulation apparatus 1 and changes the cooling water W in the circulation route R1. This arrangement ensures that a sporadic event such as abrupt evaporation of the water can be coped with by monitoring the hardness of the cooling water W without providing any special device such as a conductivity meter.

As described above, according to this embodiment, the electrolytic device 10 is provided on the cooling water circulation route R1. Such an arrangement enables mineral contents such as calcium ions and magnesium ions contained in the cooling water W to be deposited as the scale S on the electrodes 12A and 12B in the deposition step. It is possible to remove the mineral contents from the cooling water W in this way. Even if the hardness of the cooling water W is increased by evaporation of the water with elapse of time, the hardness can be reduced by the electrolytic processing. The deposition of the scale S in the circulation route R1 can be reduced in this way.

The operation is performed by reversing the polarities of the electrodes 12A and 12B at predetermined time intervals. The scale S deposited on the electrodes 12A and 12B can be easily separated in this way. Thus, the maintenance of electrolytic device 10 can be facilitated. Also, the frequency with which the cooling water W in the circulation route R1 is replaced can be limited to the least necessary number of cycles to reduce wasteful use of water resources.

Hypochlorous acid or the like having sterilizing power is produced in the cooling water W by the electrolytic processing. Thus, multiplication of microorganisms in the circulation route R1 can be prevented. In this way, the attachment of microorganisms and scale in the circulation route R1 can be limited without using any chemical solution acting as a large environmental load.

Further, the electrolytic device 10 is provided on the bypass route R2 provided on the circulation route R1. Because of such an arrangement, there is no need to stop the entire cooling water circulation apparatus 1 when a maintenance operation is performed on the electrolytic device 10; only the electrolytic device 10 may be stopped. Thus, the maintenance becomes facilitated. Also, the conductivity of the cooling water W is monitored on the basis of the values of current and voltage between the pair of electrodes 12A and 12B. In this way, the hardness of the cooling water W can be monitored without providing any special device such as a conductivity meter to cope with a sporadic event such as abrupt evaporation of the water.

The present invention will be described in further details with respect to test Examples thereof.

[Preliminary Test 1 (Checking Removal of Mineral Contents by Electrolysis)<

<Preliminary Test 1>

(1) Electrolytic Device

An anode formed of a 100×200 mm platinum plated plate and a cathode formed of a 100×200 mm platinum plated plate in mesh form were disposed in an electrolytic bath having a capacity of 8 liters.

The distance between the tw~ electrodes was set to 70 mm. An agitator was put in the electrolytic bath to enable agitation of the electrolytic solution.

(2) Test Solution

In 5000 ml of city water, 5 g of calcium chloride 2-hydrate and 5 g of sodium hydrogen carbonate were dissolved.

(3) Electrolytic Test 5 liters of the test solution prepared as described above in (2) was put in the electrolytic bath so that 72×200 mm areas of the anode and of the cathode were immersed in the test solution. In this state, electrolysis was performed while the agitator was being rotated and while a voltage of 20 V for 0.5 A was being applied between the two electrodes. 100 ml of the test solution was sampled at each of predetermined time intervals and a temperature, a pH value, an electrical conductivity, an M alkalinity, hardness and chloride ions of each test solution were measured. Measurement was made in accordance with JIS K 0101. The same amount of test solution was added at the time of test solution sampling.

(4) Descaling Test

After performing the electrolytic test described above in (3) for three hours, the anode and the cathode were reversed and a voltage of 50 V was applied for 5 minutes.

<Results>

Table 1 shows the results of measurement of a temperature, a pH value, an electrical conductivity, an M alkalinity, hardness and chloride ions of each of the test solutions immediately before the electrolytic test, one hour after the start, two hours after the start and three hours after the start.

TABLE 1

| | Temperature °C. | pH | Electrical conductivity µS/m | M alkalinity mg CaCO$_3$/l | Hardness mg/l | Chloride ions mg Cl/l |
|---|---|---|---|---|---|---|
| Before electrolysis | 10 | 7.83 | 242 | 581 | 66.89 | 42.6 |
| after 1 hour | 13 | 7.55 | 233 | 534 | 62.06 | 42.8 |
| after 2 hours | 16 | 7.17 | 220 | 434 | 51.31 | 46.6 |
| after 3 hours | 19 | 7.00 | 204 | 334 | 42.10 | 48.0 |

Referring to Table 1, the M alkalinity and the hardness decreased as the electrolysis progressed. The electrical conductivity also decreased. From this, it can be understood that mineral contents such as calcium ions and magnesium ions were removed from the test solutions. Scale was deposited on the cathode, but the scale was able to be separated by reversing the anode and the cathode and applying a voltage in the scale-separation test.

[Preliminary Test (Influence of Change in Current)]
<Preliminary Test 2-1>

The same electrolytic device and test solution as those in the above-described preliminary test 1 were used, and a voltage of 20 V for 0.5 A was applied to perform electrolysis for 2 hours. The amount of attached scale was measured from the difference between weights of the cathode before and after the electrolysis. Also, a temperature, a pH value, an electrical conductivity, an M alkalinity, hardness and a concentration of free chlorine were measured with respect to each of the test solutions before and after the electrolysis.

<Preliminary test 2-2>

A test was made in the same manner as the preliminary test 2-1 except that the current was set to 1.0 A.

<Results>

Table 2 shows the results of measurement of a weight difference of the electrode, and a temperature, a pH value, an electrical conductivity, an M alkalinity, hardness and a concentration of free chlorine of each of the test solutions in the case where the current was set to 0.5 A. Table 3 also shows the results in the case where the current was set to 1.0 A.

TABLE 2

| | Weight difference g | Temperature °C. | pH | Electrical conductivity µS/m | M alkalinity mg CaCO$_3$/l | Hardness mg/l | Concentration of free chlorine mg Cl/l |
|---|---|---|---|---|---|---|---|
| Before electrolysis | 0 | 12 | 7.77 | 245 | 575 | 524 | 0 |
| after 2 hours | 0.65 | 18 | 7.45 | 226 | 457 | 539 | 9.57 |

TABLE 3

| | Weight difference g | Temperature °C. | pH | Electrical conductivity µS/m | M alkalinity mg CaCO$_3$/l | Hardness mg/l | Concentration of free chlorine mg Cl/l |
|---|---|---|---|---|---|---|---|
| Before electrolysis | 0 | — | 7.62 | 240 | 552 | 512 | 0 |
| after 2 hours | 1.13 | — | 7.00 | 208 | 322 | 273 | 10.1 |

As shown in Tables 2 and 3, the difference between the weights of the electrode before and after the electrolysis in the case of setting the current to 1.0 A was larger than that in the case of setting the current to O.SA. This shows that more scale was deposited in the case of setting the current to 1.0 A. The reductions in the electrical conductivity, hardness and M alkalinity also were increased as the current became larger. From this, it is considered that the amount of removal of mineral contents becomes larger with larger current if a voltage is constant.

[Preliminary Test 3 (Influence of Change in Voltage)]
<Preliminary Test 3-1>

The same electrolytic device and test solution as those in the above-described preliminary test 1 were used, the distance between the electrodes was set to 4.4 mm and a voltage of 15 V for 0.5 A was applied between the electrodes, thereby performing electrolysis for 1 hour. The amount of deposited scale was measured from the difference between weights of the cathode before and after the electrolysis. Also, a temperature, a pH value, an electrical conductivity, an M alkalinity, hardness, a concentration of free chlorine, and chloride ions were measured with respect to each of the test solutions before and after the electrolysis.

<Preliminary Test 3-2>

A test was made in the same manner as the preliminary test 3-1 except that the distance between the electrodes was set to 9.3 mm and the applied voltage was set to 25 V.

<Preliminary Test 3-3>

A test was made in the same manner as the preliminary test 3-1 except that the distance between the electrodes was set to 31.2 mm and the applied voltage was set to 55 V.

<Results>

Table 4 shows the results of measurement of a weight difference of the electrode, and a temperature, a pH value, an electrical conductivity, an M alkalinity, hardness, a concentration of free chlorine, and chloride ions of each of the test solutions in the cases of setting the voltage to 15 V, to 25 V and to 55 V.

age if a current is constant. The amount of deposited scale is proportional to current×voltage to some degree. The rate at which the electrical conductivity decreased was not so large. This is considered due to the influence of the presence of sodium ions that were contained in sodium hydrogen carbonate used for adjustment of the test solution and that remained in the test solution. It is, therefore, considered that the reduction in electrical conductivity associated with the increase in voltage becomes much larger in ordinary cooling water or the like in which the content of sodium ions is not so high.

From the increase in the concentration of free chlorine, it can be understood that hypochlorous acid was produced by the electrolysis. From this, the sterilizing effect of electrolysis processing can be expected. The chloride ions had a generally constant value regardless of the magnitude of the voltage applied.

[Cooling Water Electrolytic Processing-I]

Example 1-1

Cooling water was sampled from a cooling tower of Yamaha Motor Co., Ltd. and electrolysis was performed for 1 hour with the same electrolytic device as that in the above-described preliminary test 1 by setting the distance between the electrodes to 10 mm, the current to 0.5 A and the voltage to 13 V. A temperature, a pH value, an electrical conductivity, an M alkalinity, hardness, a concentration of free chlorine, the chloride ions were measured with respect to each of the test solutions before and after the electrolysis.

Example 1-2

A test was made in the same manner as Example 1-1 except that the distance between the electrodes was set to 20 mm, the current to 0.5 A and the voltage to 21V.

Example 1-3

A test was made in the same manner as Example 1-1 except that the distance between the electrodes was set to 10 mm, the current to 1.5 A and the voltage to 28V.

TABLE 4

|  | Weight difference g | Temperature ° C. | pH | Electrical conductivity μS/m | M alkalinity mg CaCO$_3$/l | Hardness mg/l | Concentration of free chlorine mg Cl/l | Chloride ions mg Cl/l |
| --- | --- | --- | --- | --- | --- | --- | --- | --- |
| Before electrolysis | 0 | 20 | 7.65 | 237 | 537 | 629 | 0.34 | 55 |
| 15 V | 0.33 | 20 | 7.45 | 228 | 451 | 540 | 6.19 | 51 |
| 25 V | 0.62 | 20 | 7.31 | 219 | 405 | 493 | 6.87 | 52 |
| 55 V | 0.71 | 20 | 7.20 | 219 | 392 | 476 | 6.73 | 54 |

As shown in Table 4, the difference between the weights of the electrode before and after the electrolysis became lager as the voltage became lager. This shows that more scale was attached. The reductions in the electrical conductivity, hardness and M alkalinity also were increased as the voltage became larger. From this, it is thought that the amount of removal of mineral contents become larger with larger volt- <Results>

Table 5 shows the results of measurement of a temperature, a pH value, an electrical conductivity, an M alkalinity, hardness and, chloride ions of the test solution in each Example. It was not possible to measure the concentration of free chlorine, because the concentration was extremely low.

TABLE 5

| | Temperatur °C. | pH | Electrical conductivity μS/m | M alkalinity mg CaCO₃/l | Hardness mg/l | Chloride ions mg Cl/l |
|---|---|---|---|---|---|---|
| Before electrolysis | | 7.48 | 56.5 | 132.5 | 199 | 4.3 |
| 13 V | 18~19 | 7.63 | 53.4 | 124.0 | 189 | 4.3 |
| 21 V | 20~21 | 7.65 | 54.0 | 117.5 | 183 | 4.4 |
| 28 V | 18~19 | 7.82 | 53.6 | 118.0 | 176 | 4.1 |

As shown in Table 5, reductions in the electrical conductivity, hardness and M alkalinity were observed in the cooling water after the electrolysis, and it was confirmed that mineral contents were removed. Variations in the rates of reduction in the electrical conductivity, hardness and M alkalinity were not noticeable under any of the conditions. This is probably because the amounts of impurities originally contained in the cooling water were small. The amount of production of hypochlorous acid was also small.

[Cooling Water Electrolytic Processing-2]

Cooling water was sampled from a cooling tower in the shintomi factory of Aisin Seiki Co., Ltd. and electrolysis was performed for 3 hours with the same electrolytic device as that in the above-described preliminary test 1 by setting the distance between the electrodes to 53 mm, the current to 0.25 A and the voltage to 8 V. The amount of attached scale was measured from the difference between weights of the cathode before and after the electrolysis. A temperature, a pH value, an electrical conductivity, an M alkalinity, hardness, chloride ions, a concentration of free chlorine and silica in ion form were measured with respect to each of the test solutions before and after the electrolysis. The Langelier index was also computed from the measured values.

<Results>

Table 6 shows the results of measurement of a temperature, a pH value, an electrical conductivity, an M alkalinity, hardness, chloride ions, a concentration of free chlorine, a silica in ion form and a Langelier index of the test solution in each Example. Measurement was also performed in the same manner on makeup water resupplied to the cooling tower. Table 6 also shows the results of measurement on this water.

TABLE 6

| | pH | Electrical conductivity μS/m | Concentration of free chlorine mg Cl/l | M alkalinity mg CaCO₃/l | Hardness mg/l | Chloride ions mg Cl/l | Silica in ion form mg/l | Langelier index |
|---|---|---|---|---|---|---|---|---|
| Makeup water | 7.15 | 8.46 | 0.0 | 18.5 | 22.68 | 5.1 | 82 | −2.1 |
| Before electrolysis | 8.19 | 511 | 0.0 | 168.5 | 999.4 | 705 | 1300 | 1.46 |
| After electrolysis | 6.53 | 501 | 4.9 | 54.5 | 869.1 | 680 | 1200 | −0.75 |

Mineral contents in the cooling water sampled from the cooling tower (before the electrolysis) had been substantially enriched in comparison with the original water (makeup water). The electrical conductivity, the M alkalinity and the hardness were reduced in the cooling water after the electrolysis and scale was deposited on the cathode. The difference between the weights of the cathode before and after the electrolysis was 0.54 g. From this, it can be said that mineral contents such as calcium ions and magnesium ions were removed from the cooling water by the electrolysis. Also, the concentration of silica in ion form, which can be a cause of scale, as well as calcium ions and magnesium ions, was also reduced. It was also found that silica in ion form was also removed from the cooling water. The reduction in the Langelier index that provides a measure of adhesivity of scale also indicates that the electrolysis changed the cooling water so that scale was not easily produced in the water.

The concentration of free chlorine was also increased. It can therefore be said that hypochlorous acid or the like having sterilizing power was produced in the cooling water by the electrolysis. From this, it can be said that the electrolysis turned the cooling water to water in which multiplication of microorganisms is hard to occur.

While in the above-described embodiment the bypass route 2 is provided and the electrolytic device 10 is installed on the bypass route R2, the cooling tower and the electrolytic device are connected by water flow pipes to form one loop without providing the bypass route.

While in the above-described embodiment the opposite ends of the bypass route 2, i.e., the ends of the water supply pipe 15 and the outflow pipe 16 are connected to the cooling tower 3, the opposite ends of the bypass route may alternatively connected, for example, to the water flow pipes 4.

While the cooling water circulation apparatus in the embodiment is an apparatus for circulating the cooling water W through the heat exchanger 2 provided in an air cooling apparatus, a refrigeration apparatus or the like, the appliance to be cooled is not particularly specified and may be any appliance as long as it is cooled by circulating cooling water.

What is claimed is:

1. A method of removing scale from cooling water in a cooling water circulation route through which the cooling water is circulated, the method comprising:

providing a cooling water circulation apparatus which includes:

(i) a cooling device configured to cool cooling water;

(ii) a cooling water circulation route including the cooling device, the cooling water being circulated through the cooling water circulation route; and (iii) an electrolytic device configured to perform electrolytic processing on the cooling water in the cooling water circulation route, wherein the electrolytic device includes:
(a) the first electrode;
(b) the second electrode;
(c) an electrolytic bath for storing the cooling water; and
(d) a voltage source for applying a voltage and a direct current between the first electrode and the second electrode, a first electrolytic operation which includes precipitating mineral contents in the cooling water on a surface of the first electrode immersed in the cooling water in the electrolytic bath by applying a direct current voltage between the first electrode and the second electrode;

a second electrolytic operation which includes precipitating mineral contents in the cooling water on a surface of the second electrode in the cooling water in the electrolytic bath by applying a direct current voltage between the first electrode and the second electrode while the polarities of the first electrode and the second electrode are reversed relative to the polarities thereof in said first electrolytic operation;

repeatedly and alternately executing said first electrolytic operation and said second electrolytic operation;

a first discharging operation performed before each repetition of the first electrolytic operation and after each repetition of the second electrolytic operation, the first discharging operation including separating mineral contents from the second electrode by reversing the polarities of the first electrode and the second electrode relative to the polarities thereof in said second electrolytic operation, and discharging the water in the electrolytic bath and the separated minerals to waste;

a second discharging operation performed before each repetition of the second electrolytic operation and after each repetition of the first electrolytic operation, the second discharging operation including separating mineral contents from the first electrode by reversing the polarities of the first electrode and the second electrode relative to the polarities thereof in said first electrolytic operation, and discharging the water in the electrolytic bath and the separated minerals to waste;

computing the conductivity of the cooling water based on the voltage and the direct current between the first electrode and the second electrode at predetermined time intervals during the first electrolytic operation and the second electrolytic operation; and changing the cooling water in the circulation route when conductivity computed in said computing operation exceeds a predetermined value, wherein the electrolytic bath is disposed on a bypass route such that discharging the water in the electrolytic bath does not discharge the water in the circulation route.

* * * * *